US007760636B1

(12) United States Patent
Cheriton (10) Patent No.: US 7,760,636 B1
(45) Date of Patent: Jul. 20, 2010

(54) RETRANSMISSION AND FLOW CONTROL IN A LOGICAL NETWORK TUNNEL

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1275 days.

(21) Appl. No.: 10/764,692

(22) Filed: Jan. 26, 2004

(51) Int. Cl.
*H04L 12/56* (2006.01)
*H04L 12/28* (2006.01)
*H04J 3/14* (2006.01)

(52) U.S. Cl. .................. 370/235; 370/230; 370/412

(58) Field of Classification Search ............... 370/230, 370/230.1, 235, 236, 252, 412–418
See application file for complete search history.

(56) References Cited

U.S. PATENT DOCUMENTS

| | | | | |
|---|---|---|---|---|
| 6,145,032 | A * | 11/2000 | Bannister | 710/52 |
| 6,487,689 | B1 * | 11/2002 | Chuah | 714/748 |
| 6,519,254 | B1 * | 2/2003 | Chuah et al. | 370/389 |
| 6,675,225 | B1 * | 1/2004 | Genty et al. | 709/245 |
| 6,801,940 | B1 * | 10/2004 | Moran et al. | 709/224 |
| 6,937,566 | B1 * | 8/2005 | Forslow | 370/231 |
| 6,975,647 | B2 * | 12/2005 | Neale et al. | 370/466 |
| 6,977,932 | B1 * | 12/2005 | Hauck | 370/392 |
| 7,117,267 | B2 * | 10/2006 | Bavadekar | 709/230 |
| 7,251,218 | B2 * | 7/2007 | Jorgensen | 370/235 |
| 7,292,531 | B1 * | 11/2007 | Hill | 370/230.1 |
| 7,299,277 | B1 * | 11/2007 | Moran et al. | 709/224 |
| 7,369,574 | B1 * | 5/2008 | Parruck et al. | 370/474 |
| 2002/0146016 | A1 * | 10/2002 | Liu et al. | 370/401 |
| 2003/0112756 | A1 * | 6/2003 | Le Gouriellec et al. | 370/230 |
| 2003/0219022 | A1 * | 11/2003 | Dillon et al. | 370/395.52 |
| 2004/0170173 | A1 * | 9/2004 | Pan et al. | 370/392 |
| 2005/0005024 | A1 * | 1/2005 | Samuels et al. | 709/238 |
| 2006/0062233 | A1 * | 3/2006 | Brewer et al. | 370/412 |

OTHER PUBLICATIONS

Victoria Fineberg, QoS Support in MPLS Network, MPLS/Frame Relay Alliance White Paper, MPLS Forum, May 2003 pp. 1-26.*
Partho P. Mishra, Dheeraj Sanghi, and Satish K. Tripathi, "TCP Flow Control in Lossy Networks: Analysis and Enhancement," Department of Computer Science, University of Maryland, Oct. 1992, pp. 1-12.
Yong Xiong, Jyh-Charn Liu, Wei Zhao, "On The Smoothing of Traffic Flows Using ON-OFF Control," Computer Science Department, Texas A & M University, Published Dec. 3, 2003, pp. 1-3.

(Continued)

*Primary Examiner*—Chi H Pham
*Assistant Examiner*—Ahmed Elallam
(74) *Attorney, Agent, or Firm*—Campbell Stephenson LLP (57) ABSTRACT

A system includes a network tunnel, an ingress network device coupled to send packets via the network tunnel, and an egress network device coupled to receive packets sent via the network tunnel. The egress network device is configured to provide information to the ingress network device. The information indicates whether a packet transmitted from the ingress network device to the egress network device was dropped in the network tunnel. The ingress network device can retransmit the packet to the egress network device if the packet is dropped in the network tunnel.

36 Claims, 8 Drawing Sheets

OTHER PUBLICATIONS

"White Paper, IP Sec, Executive Summary" Cisco Systems, Inc., published Nov. 21, 2000; 13 pages; http://www.cisco.com/warp/public/cc/so/neso/sqso/egso/ipsec_wp.html.

"Fact Sheet, Layer 2 Tunneling Protocol, *A Feature in Cisco IOS Software*," Cisco Systems, Inc., published Jul. 8, 2002; 8 pages; http://www.cisco.com/warp/public/cc/pd/iosw/prodlit/12tun_ds.html.

W. Stevens, RFC Archive—"TCP Slow Start, Congestion Avoidance, Fast Retransmit, and Fast Recovery Algorithms," Network Working Group, Request for Comments: 2001, Jan. 1997, 9 pages; http://rfc.sunsite.dk/rfc/rfc2001.html.

* cited by examiner

Tunnel State Information 416
(for Deferred Deletion Queue (DD-Q) 422):

| |
|---|
| Next Sequence Number 452 |
| Next Sequence Number Expected 454 |
| Update Count 456 |
| Update Count Limit 458 |

RETRANSMISSION AND FLOW CONTROL IN A LOGICAL NETWORK TUNNEL

FIELD OF THE INVENTION

The present invention relates to networking and, more specifically, to network switches that implement a logical network tunnel.

BACKGROUND

Network tunnels are used to aggregate packet traffic between two network devices and can facilitate features such as private addressing, traffic engineering, communication of common properties of tunneled traffic, and aggregation of multiple flows over a single secure connection. Private addressing involves encapsulating private addresses with the packets being conveyed over the tunnel. Traffic engineering involves encapsulating addressing, which describes a particular path within the network, with a packet. The encapsulated addressing causes the packet to be forwarded along that path, independent of any addressing contained within the packet itself. By aggregating multiple flows into a single network tunnel over a secure connection, the aggregated flows can be protected (with respect to confidentiality, integrity and authentication) without having to establish a secure connection on a per flow basis.

Implementing a network tunnel typically involves encapsulating packets to be conveyed via the tunnel. These packets are encapsulated with a tunnel-specific header appropriate to the particular tunneling protocol being used. Examples of tunneling protocols include GRE (Generic Routing Encapsulation), MPLS (Multiprotocol Label Switching), and L2TP (Layer 2 Tunneling Protocol).

Traffic conveyed via network tunnels often experiences reduced performance relative to the performance of traffic that is not conveyed via a network tunnel. In particular, tunneled traffic may experience a higher loss rate than non-tunneled traffic. This higher loss rate arises when a tunnel, which appears as a single flow even though the tunnel actually aggregates multiple flows, experiences packet drop due to mechanisms such as RED (Random Early Detection), WRED (Weighted Random Early Detection), and DBL (Dynamic Buffer Limiting). These mechanisms cause packets to be dropped within a particular flow in order to signal that the flow should reduce its rate. These mechanisms signal rate reduction to individual flows instead of to the tunnel in which several individual flows are being aggregated. Furthermore, these packet drop mechanisms do not differentiate between the individual flows being aggregated within a tunnel. Accordingly, a packet selected to be dropped within the tunnel may be part of a flow that is not actually a significant portion of the tunnel's traffic. Thus, the use of such packet-drop mechanisms may cause tunneled flows that are not significant contributors to congestion to experience packet drop, leading to those flows reducing their rates, even though they are not actually large contributors to the congestion. The tunneled flows that are significant contributors to congestion may escape their share of packet drop, and as a result, these flows will not reduce their rates by an appropriate amount needed to actually reduce the congestion. Thus, the flow control provided by packet drop mechanisms may not be effective in reducing congestion when applied to a network tunnel.

Additionally, tunneled packets are often more prone to being dropped than non-tunneled packets because packets exiting a tunnel can require more processing than non-tunneled packets. This extra processing is due to the need to process both the tunnel header as well as the inner header (the original packet header, before encapsulation for transmission via the tunnel) of the packet. Consequently, many network devices cannot implement wire-speed tunnel egress processing, introducing another source of random packet loss. Tunneled packets can also be more prone to drop because all the packets in a tunnel appear as a single flow in an intermediate router. For example, if 100 TCP flows are aggregated into a tunnel, a typically fair-queuing mechanism at a congested intermediate router would give the aggregated flows $\frac{1}{100}$ of the bandwidth that would be allocated if the flows were not aggregated, causing dramatically higher drops.

SUMMARY

Various embodiments of systems and methods for maintaining tunnel state information indicating which packets have been transmitted via a logical network tunnel are disclosed. Such systems and methods may be used to implement flow control and/or retransmission within a logical network tunnel.

In one embodiment, a network device (e.g., a network device at the ingress of a logical network tunnel) includes an output port and a memory coupled to the output port. The output port is configured to output packets for transmission via a network tunnel. The memory is configured to store information, which identifies packets which have been forwarded via the network tunnel. The network device can also include a queue that is configured to store a copy of a packet forwarded to the output port. In response to the packet being forwarded to the output port, a control unit can update the information in the memory to indicate that the packet was sent via the network tunnel. If the packet is dropped in the network tunnel, the control unit retransmits the packet by forwarding the copy of the packet stored in the queue to the output port for transmission via the network tunnel.

In some embodiments, a network device (e.g., a network device at the egress of a logical network tunnel) includes an input port configured to receive a packet conveyed via a network tunnel and a control unit coupled to the input port. The control unit is configured to detect reception of the packet by the input port and to generate information, which indicates whether the packet is a particular packet. For example, the information can indicate whether the packet is an expected packet that the network device expected to receive. The control unit is configured to include the information in a tunnel update packet, which can also include a sequence number of a next packet expected to be received by the network device.

In one embodiment, a system includes a network tunnel, an ingress network device coupled to send packets via the network tunnel, and an egress network device coupled to receive packets sent via the network tunnel. The egress network device is configured to provide information to the ingress network device. The information indicates whether a packet transmitted from the ingress network device to the egress network device was dropped in the network tunnel. The ingress network device can retransmit the packet to the egress network device if the packet is dropped in the network tunnel.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present inven-

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form-disclosed. Instead, the intention is to cover all modifications, equivalents and alternatives falling within the spirit and scope of the invention as defined by the appended claims.

DETAILED DESCRIPTION

Network devices that send and/or receive packets being transmitted via a logical network tunnel can perform flow control and packet retransmission within the logical network tunnel. In some embodiments, these techniques are implemented by maintaining state information at the tunnel ingress indicating which packets have been transmitted via the network. This state information can be used to track which packets are currently within the tunnel (e.g., packets within the tunnel are non-dropped packets that have been encapsulated for transmission via the network tunnel but that have not yet been received and de-encapsulated at the tunnel egress). The tunnel egress sends packets to the tunnel ingress to indicate which of the outstanding packets have been received, and the tunnel ingress updates the state information in response to these packets. The tunnel ingress also stores a copy of each outstanding packet when that packet is initially sent via the network tunnel. If a packet sent from the tunnel egress indicates that a packet was dropped within the network tunnel, the tunnel ingress sends another copy of that packet via the network tunnel. The packet sent from tunnel egress can also include flow control information indicating how many packets the tunnel egress is prepared to receive. In response to this flow control information, the tunnel ingress can limit the number of packets admitted to the tunnel. Additionally, the tunnel ingress can adjust the rate at which packets are accepted into the network tunnel in response to learning that one or more packets have been dropped within the network tunnel.

Figure 1:
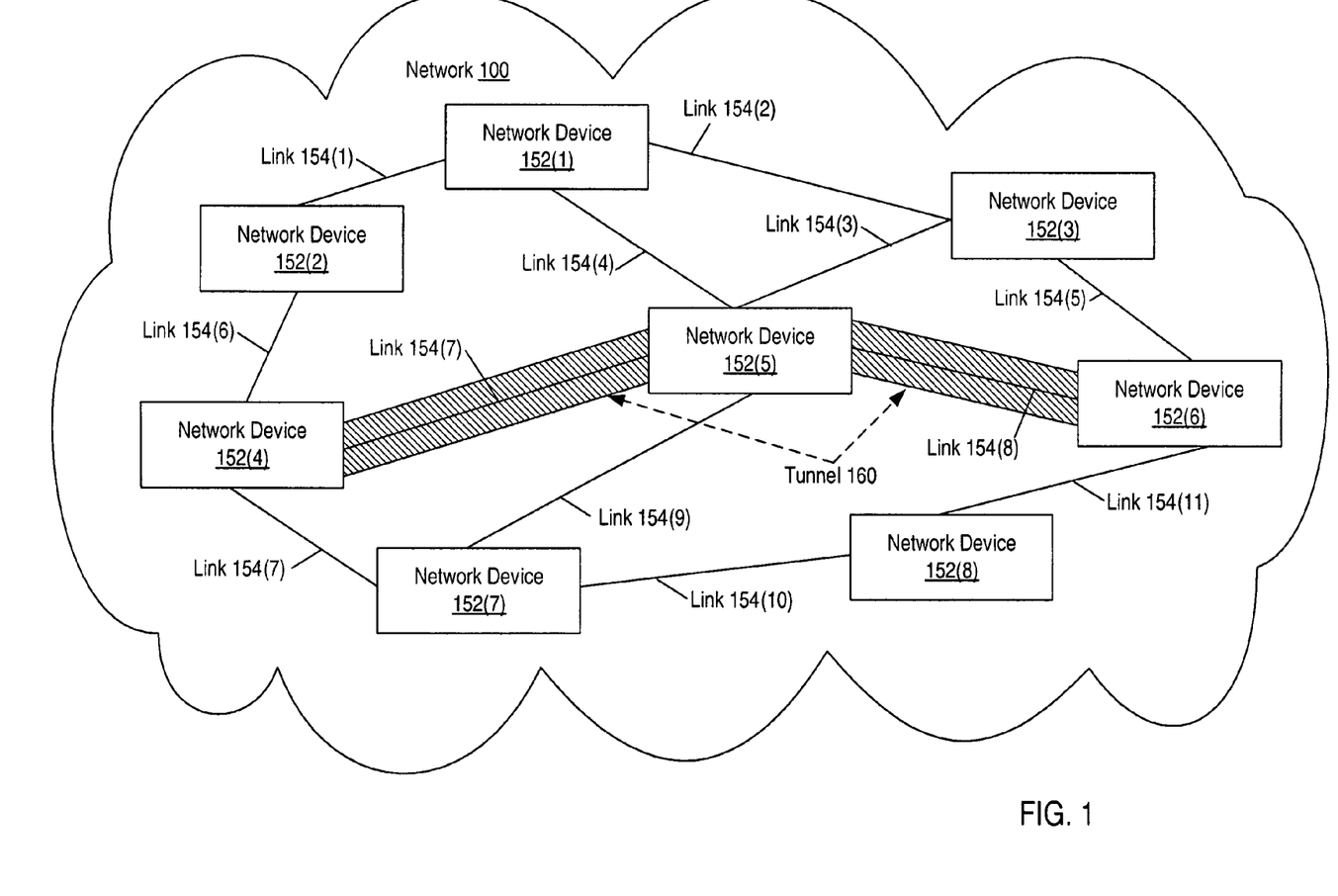
FIG. 1 is a block diagram of a network that implements a logical network tunnel, according to one embodiment of the present invention.

FIG. 1 is a block diagram of a network that implements a logical network tunnel (such logical network tunnels are also referred to as tunnels or network tunnels throughout this document). Network 100 includes several network devices 152(1)-152(8) (collectively, network devices 152). Each network device 152 can be any type of network device that forwards or switches packets, such as a switch, router, or the like. Each network device is coupled to one or more other network devices by one of links 154(1)-154(11) (collectively, links 154). For example, network device 152(1) is coupled to network device 152(2) by link 154(1). Network device 152(1) is also coupled to network device 152(3) by link 154(2), and is similarly coupled to network device 153(5) by link 154(4). Each link 154 is a physical network link (e.g., an Ethernet link) that allows one network device to communicate with another network device.

In a communications network such as network 100, network devices 152 each operate by receiving data at an input interface and forwarding the data to one or more output interfaces. The data received and forwarded by network devices 152 is logically grouped into one or more packets. Throughout this disclosure, the term "packet" is used to refer to a logical grouping of information sent as a data unit over a transmission medium. Packets can include header and/or trailer information that surrounds user data contained in the data unit. For purposes of this disclosure, a "packet" may include a cell, datagram, frame, message, segment, or any other logical group of information.

Network 100 implements tunnel 160 between network device 152(4) and network device 152(6). Tunnel 160 is a logical tunnel that is implemented according to a particular tunneling protocol. Tunnel 160 includes a port (which communicates packets via network link 154(8)) in network device 152(4), link 154(8), two ports (which communicate packets via link 154(8) and link 154(9) respectively) in network device 152(5), link 154(9), and a port (which communicates packets via link 154(9)) in network device 152(6). For packets being transmitted from network device 152(4) to network device 152(6) via tunnel 160, network device 152(4) is described as the ingress network device (e.g., the point at which such packets enter tunnel 160) and network device 152(6) is described as the egress network device (e.g., the point at which such packets exit tunnel 160). Packets enter tunnel 160 at ingress device 152(4) when they are encapsulated at ingress network device 152(4) and queued for transmission via the port that communicates packets via link 154(8). These packets exit tunnel 160 at egress device 152(6) when they are received via network link 154(9) and de-encapsulated.

Each network device 152(4)-152(6) uses a tunneling protocol (e.g., GRE (Generic Routing Encapsulation) or IPSec ESP (Internet Protocol Security (IPSec) Encapsulating Security Payload (ESP)) to communicate packets via tunnel 160. For example, network device 152(4) can send a packet to network device 152(6) via tunnel 160 by encapsulating that packet with a tunnel header and then forwarding the encapsulated packet to network device 152(5) via link 154(7) according to information in the tunnel header. Network device 152(5) also uses the information in the tunnel header to forward the packet along tunnel 160 (via link 154(8)) to network device 152(6)). Network device 152(6) de-encapsulates the packet by removing the packet header. Packets are conveyed in order (e.g., as indicated by sequence numbers included in each packet) via tunnel 160, allowing packet drop within the tunnel to be detected if packets are received out-of-order.

Network devices 152(4)-152(6) support retransmission and flow control within tunnel 160. Network device 152(4), at the ingress of tunnel 160, maintains state information that indicates which packets are currently outstanding within the tunnel. Network device 152(4) can also store a copy of each packet that is output on link 154(7) for transmission via tunnel 160. Network device 152(6) sends tunnel update packets to network device 152(4). These tunnel update packets indicate which of the outstanding packets, if any, have been received at the egress of network tunnel 160. Additionally, the tunnel update packets indicate a "window" of packets that the egress of network tunnel 160 is prepared to receive (e.g., the size of this window can vary depending on the available buffer space for storing tunneled packets). In response to the tunnel update packets, network device 152(4) updates its state information and/or sends a copy of any packet that was not received at the tunnel egress. Network device 152(4) can also control the bandwidth available to tunnel 160 based on the information in the tunnel update packets.

Figure 2:
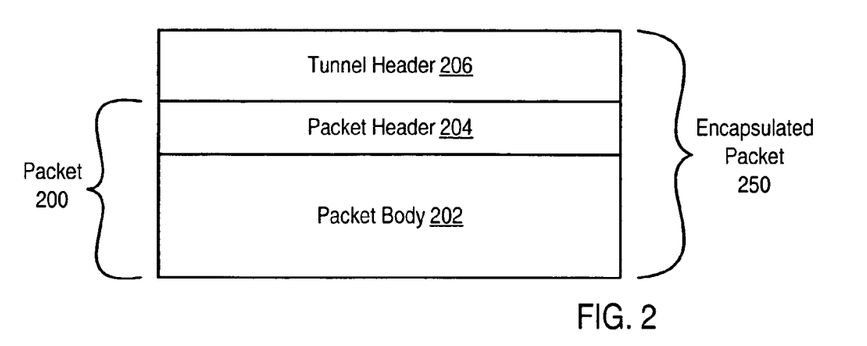
FIG. 2 illustrates a packet that has been encapsulated for transmission via a network tunnel, according to one embodiment of the present invention.

FIG. 2 illustrates a packet that has been encapsulated for transmission via a network tunnel. As shown, packet 200 includes packet body 202 and packet header 204. Packet header 204 is also referred to as an "inner" header. Packet 200 is encapsulated for transmission via a network tunnel by adding tunnel header 206, forming encapsulated packet 250.

Figure 3:
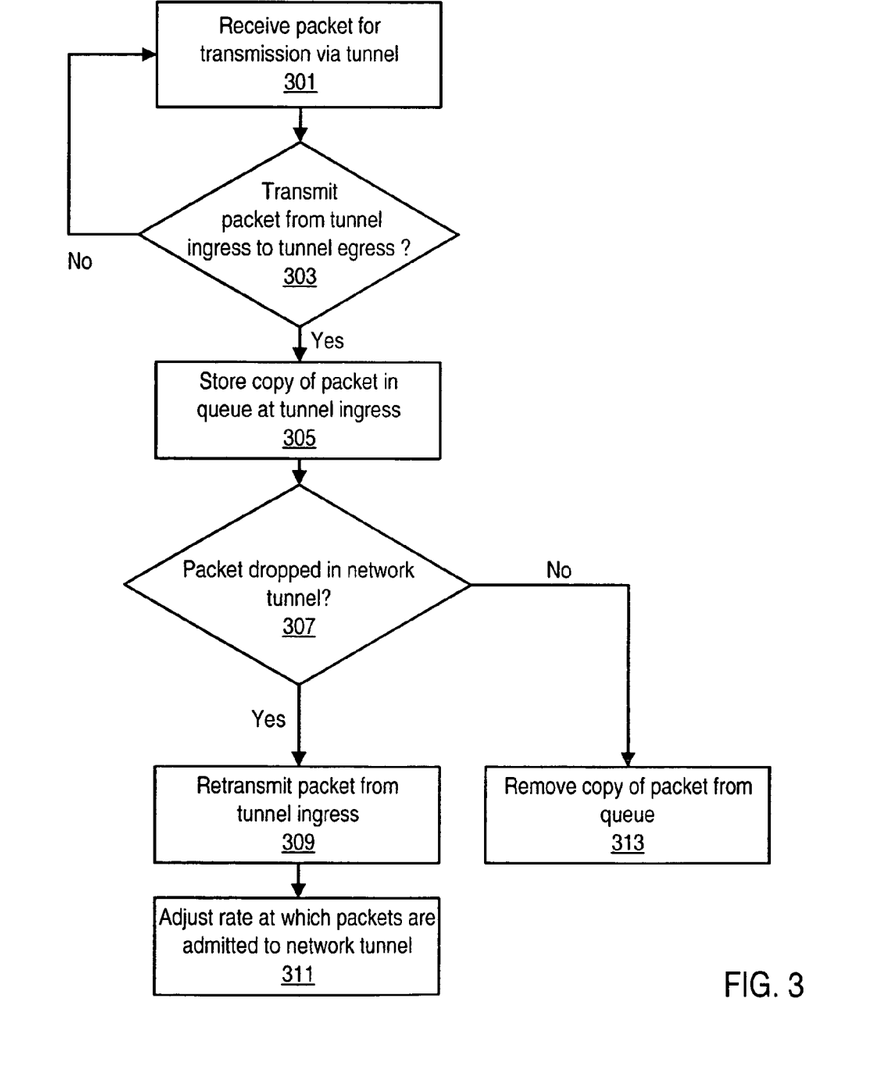
FIG. 3 is a flowchart of one embodiment of a method of implementing a network tunnel that supports packet retransmission.

FIG. 3 is a flowchart of one embodiment of a method of implementing a network tunnel that supports packet retransmission. At 301, a packet is received for transmission via a network tunnel. If the packet is transmitted via the network tunnel (e.g., if the packet is encapsulated with a tunnel header and the resulting encapsulated packet is output from an ingress network device), a copy of the packet is stored in a queue within the ingress network device, as shown at 303-305. The packet can be stored in the queue within the ingress network device by retransmitting the packet via a port associated with the queue.

If the packet is dropped within the network tunnel (e.g., if the packet is not received at the tunnel egress), as determined at 307, the packet is retransmitted from the tunnel ingress, as indicated at 309. Performing function 309 can involve the ingress network device outputting the copy of the packet stored in the queue (at 305) from a port associated with the network tunnel. In some embodiments, the ingress network device also removes the copy of the packet from the queue after outputting the copy of the packet. The ingress network device can also adjust the rate at which packets are admitted into the network tunnel in response to learning that a packet has been dropped within the tunnel, as indicated at 311. If the packet is not dropped within the network tunnel (e.g., if the packet is successfully transmitted from the ingress network device to the egress network device), the packet is removed from the queue, as shown at 313.

Figure 4A:
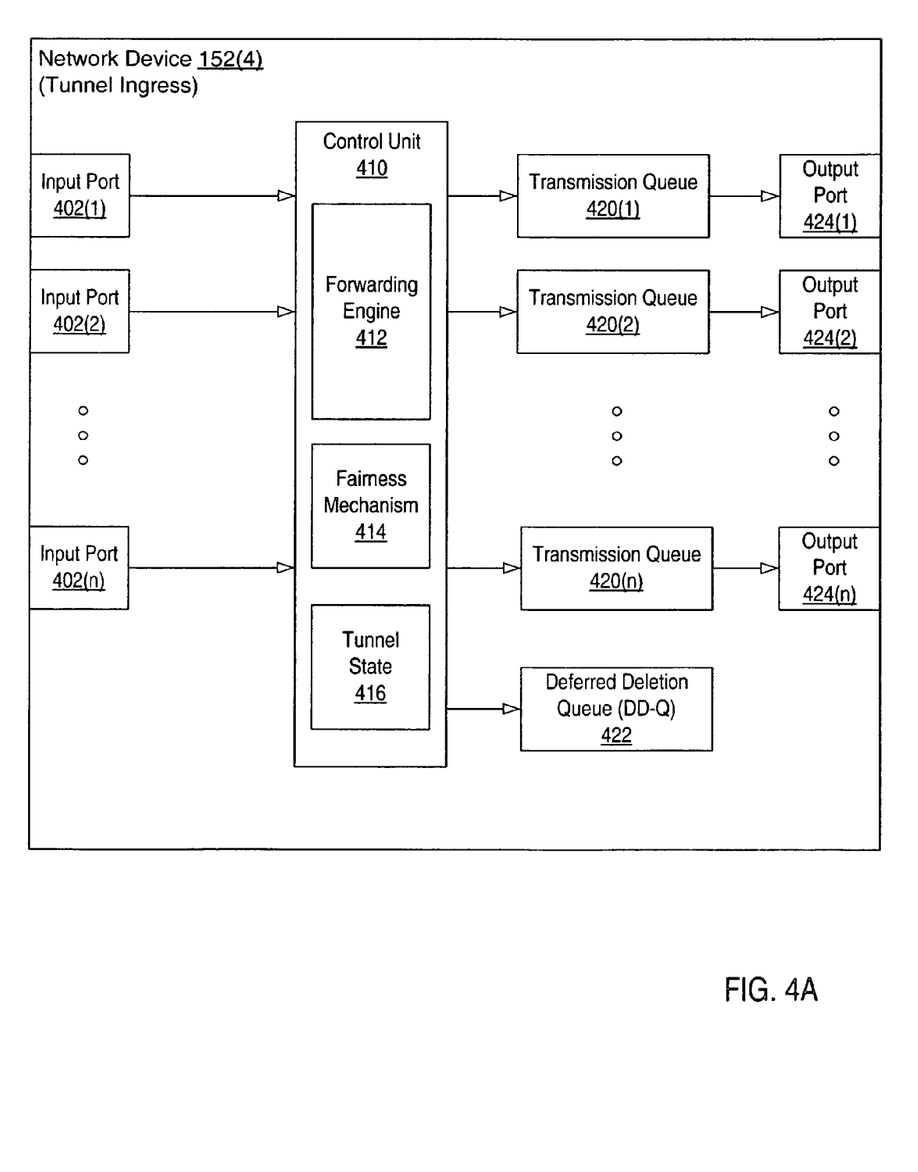
FIG. 4A shows a block diagram of a network device for use at the ingress of a network tunnel, according to one embodiment of the present invention.

FIG. 4A shows a block diagram of a network device for use at the ingress of a network tunnel, according to one embodiment of the present invention. Here, network device 152(4) is the tunnel ingress for packets being conveyed from network device 152(4) to network device 152(6) via network tunnel 160 in FIG. 1. Network device 152(4) includes several input ports 402(1)-402(n) (collectively, input ports 402), control unit 410, which includes forwarding engine 412, fairness mechanism 414, and tunnel state information 406, transmission queues 420(1)-420(n) (collectively, transmission queues 420), deferred deletion queue (DD-Q) 422, and output ports 424(1)-424(n) (collectively, output ports 424).

It is noted that the particular value of 'n' may vary among embodiments and among different components in the same embodiment. It is also noted that network device 152(4) can include fewer components and/or can include other components instead of and/or in addition to those shown in FIG. 4A, and that the interconnections between those components can vary among embodiments.

Control unit 410 can be implemented in hardware, software, or a combination of hardware and software. Transmission queues 420(1)-420(n), deferred deletion queue 422, and/or tunnel state information 406 can be implemented in a memory device within network device 152(4). For example, a unique range of memory within that memory device can be allocated to each transmission queue 420(1)-420(n) as well as to each deferred deletion queue 422. Alternatively, each transmission queue 420 and/or each deferred deletion queue 422 can be implemented in a physically-separate dedicated memory device. In other embodiments, more than one transmission queue 420 and/or deferred deletion queue 422 is allocated in each of several physically-separate memory devices.

Each input port 402 receives packets communicated to network device 152(4) via a particular link. Forwarding engine 412 in control unit 410 forwards or routes packets received via input ports 402 to appropriate output ports 424 based on information included in each packet's packet header. Packets forwarded to a particular output port can be temporarily stored in a transmission queue associated with that output port. For example, a packet forwarded to output 424(2) can be temporarily stored in transmission queue 420(2) while awaiting transmission via output port 424(2). Each output port 424 outputs packets on a particular link.

When a tunnel is established between ingress network device and egress network device, a "deferred deletion queue" is allocated (if a dedicated deferred deletion queue is not already available for that tunnel) at the tunnel ingress. Here, deferred deletion queue 422 is allocated in network device 152(4) for network tunnel 160. The allocation of such a queue can be performed automatically (e.g., control unit 410 can assign an unused one of transmission queues 420 to be deferred deletion queue 422) or manually (e.g., by an administrator) when the tunnel is established. Deferred deletion queue 422 stores copies of packets that are currently outstanding within network tunnel 160. Packets are considered to be outstanding if they have been output from an output port 424 of network device 152(4) and if receipt of those packets has not yet been acknowledged by the network device at the tunnel egress.

The size of deferred deletion queue 422 can correspond to a product of the delay of tunnel 160 and the bandwidth of tunnel 160. In embodiments in which network device 152(4) supports multiple simultaneous tunnels, the maximum number of tunnels network device 152(4) is capable of supporting may be limited according to the product of delay and bandwidth.

When a packet is received via one of input ports 402, forwarding engine 412 uses information in the packet's header to determine the forwarding action to take. For example, forwarding engine 412 can access a lookup table, based on the packet's header, in order to determine how to forward the packet. One possible forwarding action is to forward the packet via a network tunnel. For example, for certain packets, a lookup table will return forwarding information that informs forwarding engine 412 that the packet should be forwarded via a particular network tunnel. This tunnel forwarding information can also identify the deferred deletion queue associated with that network tunnel. Conventional ACLs (Access Control Lists), policing, and QoS (Quality of Service) handling can also be performed by forwarding engine 412 at this stage.

When forwarding engine 412 determines that a packet should be transmitted via a network tunnel, control unit 410 encapsulates that packet with an appropriate tunnel header and forwards the encapsulated packet to the transmission queue for the output port associated with the tunnel. For example, if output port 424(1) is coupled to link 154(7) of FIG. 1, control unit 410 can forward packets that are to be transmitted via tunnel 160 (as shown in FIG. 1) to transmission queue 420(1) for output via output port 424(1). Additionally, control unit 410 stores a copy of each packet that is transmitted via the network tunnel (e.g., each tunneled packet that is output from an output port associated with a network tunnel) in deferred deletion queue 422, as will be described in more detail below.

Fairness mechanism 414 implements a congestion signaling technique such as RED (Random Early Detection), WRED (Weighted Random Early Detection), or DBL (Dynamic Buffer Limiting). Before a tunneled packet is added to the transmission queue for the output port associated with the network tunnel, fairness mechanism 414 can apply a congestion signaling technique to determine whether the packet should instead be dropped. Normally, such techniques are applied based on the number of packets currently stored in the transmission queue for the output port associated with the network tunnel. However, in at least some embodiments, the congestion signaling techniques can instead be applied based on the level of deferred deletion queue 422. For example, if DBL is being used, the flow label of the original packet (before encapsulation for transmission via the tunnel) is hashed into the DBL flow table corresponding to the packet being added to deferred deletion queue 422. Fairness mechanism 414 determines whether to drop the packet based on the number of packets for this particular flow that are already added in deferred deletion queue 422 (using the DBL computation rules) (this determination can also be based on the total number of packets that are already added in deferred deletion queue 422). In one embodiment, fairness mechanism 414 determines whether to drop the packet based on whether the flow that includes the packet already has a threshold number of packets stored in deferred deletion queue 422. As these examples show, congestion signaling can be applied to ingress traffic into a tunnel based on how much of a given flow is actually outstanding within the tunnel, as opposed just being based on how many packets are in the transmission queue used by the tunnel. As a result, a fragile flow that has relatively few outstanding packets can largely be protected against packet drop due to congestion caused by another very aggressive flow that has a large number of outstanding packets within the same tunnel.

In addition to dropping packets based on the number of packets in deferred deletion queue 422 for a particular flow, fairness mechanism 414 can also drop packets seeking admission to the tunnel based on other factors. For example, a packet is also dropped if deferred deletion queue 422 is full. Fairness mechanism 414 may also drop the packet if the transmission queue for the output port associated with the network tunnel is congested.

If the packet is not dropped by fairness mechanism 414, control unit 410 adds a packet sequence number (which can be determined from tunnel state information 416) to the packet's tunnel header and adds the packet to the appropriate transmission queue 420. Control unit 410 updates tunnel state information 416 to reflect the fact that another packet is now outstanding within the network tunnel. Control unit 410 generates a packet descriptor associated with the packet to identify deferred deletion queue 422 for tunnel 160.

After transmission of a packet whose packet descriptor identifies deferred deletion queue 422, control unit 410 causes the packet to be added to the end of deferred deletion queue 422 rather than simply being deleted from one of transmission queues 420. In one embodiment, control unit 410 can add the packet to the end of the specified deferred deletion queue by simply marking the packet to not be freed on transmission and re-enqueuing the packet in deferred deletion queue 422.

In many embodiments, control unit 410 causes a packet to be stored in deferred deletion queue 422 by "recirculating" that packet (e.g., in some designs, this operation is easier and/or more efficient than re-enqueuing the packet). Recirculation is implemented by looping the packet back through a normal port interface so that the packet is effectively re-received by ingress network switch 152(4) and enqueued in deferred deletion queue 422. Recirculation is conventionally used so that control unit 410 can apply packet egress processing, packet lookup, classification, ACLs (Access Control Lists), policing, and the like to the packet an additional time. To implement recirculation, a port can be configured as a recirculation port and set in "loopback mode" so that the recirculation port will not receive packets from an external connection. This way, the recirculation port will not receive external traffic that might otherwise conflict with the recirculated packet traffic. In such embodiments, the memory bandwidth used for recirculation is effectively the memory bandwidth allocated to the recirculation port. Accordingly, in some embodiments, a conventional network device can be configured to include deferred deletion queue 422 without needing much, if any, additional memory.

Network device 152(4) is configured to receive tunnel update packets from network device 152(6) at the egress of tunnel 160. These tunnel update packets indicate which, if any, of the outstanding packets within tunnel 160 have been received by network device 152(6). In response to network device 152(4) receiving one of these tunnel update packets, control unit 410 can update tunnel state information 416. For example, if a tunnel update packet indicates that two outstanding packets have been received at the tunnel egress, control unit 410 can update tunnel state information 416 to indicate that those two packets are no longer outstanding. If a tunnel update packet indicates that a packet was dropped within tunnel 160, control unit 410 can cause a copy of the dropped packet to be output from deferred deletion queue 422 via the output port associated with tunnel 160. Control unit 410 can also cause fairness mechanism 414 to adjust the rate at which packets are admitted to tunnel 160 in response to receiving a tunnel update packet indicating that a packet has been dropped within the network tunnel.

Tunnel update packets can each include information identifying the tunnel with which those packets are associated. For example, these update packets can each include tunnel identification information that forwarding engine 412 can use to map each packet to the deferred reception queue associated with the identified tunnel.

A tunnel update packet sent to network device 152(4) identifies a window of packets that the tunnel egress is currently prepared to receive. This window can be identified using packet sequence numbers. For example, a tunnel update packet can include the sequence number of the next packet that the tunnel egress expects to receive as well as a number indicating how many packets the tunnel egress is prepared to receive. Alternatively, the tunnel update packet can specify the sequence number of the last (in sequence order) packet the tunnel egress is prepared to receive. Based on the size of the window indicated in the tunnel update packet, control unit 410 can adjust the size of deferred deletion queue 422 (e.g., by adjusting values included in tunnel state information 416). Since adjusting the size of deferred deletion queue 422 controls how many packets are admitted to tunnel 160 (e.g., fairness mechanism 414 drops packets based, at least in part, on the occupancy of deferred deletion queue 422), this provides a form of flow control with tunnel 160.

In some embodiments, control unit 410 retransmits a dropped packet at most once. In such embodiments, control unit 410 causes the copy of the packet to be removed from deferred deletion queue 422 when that copy is retransmitted and marked to indicate that the copy should be deleted on transmission. In alternative embodiments, control unit 410 leaves the copy of the packet in deferred deletion queue 422, allowing the packet to be retransmitted multiple times, if needed. In one such embodiment, deferred deletion queue 422 stores a value for each queued packet, indicating how many times each queued packet has been retransmitted. If the value for a particular packet exceeds a pre-specified limit, control unit 410 removes that packet from deferred deletion queue 422.

By implementing retransmission of tunneled packets, the individual flows encapsulated in a tunnel are largely protected against packet drop. The use of tunnel update packets allows any packet drop that does occur within the tunnel to be communicated back to the tunnel ingress, allowing the tunnel ingress to adjust that rate at which packets are admitted to the tunnel in order to avoid further packet drop.

In some embodiments, control unit 410 controls the rate of packet removal from deferred deletion queue 422. For example, an administrator can specify a maximum rate of removal, and control unit 410 can control the removal of packets from deferred deletion queue 422 such that this rate is not exceeded. This effectively limits ingress traffic into the tunnel to the specified rate, at least on average. For example, if removal from deferred deletion queue 422 is limited to 100 Mbps, traffic in tunnel 160 would be limited to this rate of traffic over time, but would be allowed to have instantaneous bursts of higher rates, up to the capacity of deferred deletion queue 422.

If deferred deletion queue 422 is full, control unit 410 can advance the head of the queue, effectively deleting the oldest packet in deferred deletion queue 422 in order to make room for new packets. Control unit 410 can track the number of times that deferred deletion queue 422 is advanced because of being full. Based on this number (e.g., if this number exceeds a threshold number), network device 152(4) can reduce the rate at which packets are admitted to tunnel 160, which may in turn reduce the loss rate within tunnel 160. Fairness mechanism 414 allocates the reduced tunnel bandwidth among the competing flows making up the tunnel traffic.

If network device 152(4) does not send any packets via tunnel 160 for a period of time, network device 152(4) can transmit a packet over the tunnel. (e.g., this can be performed by software executing on network device 152(4)). By ensuring that at least one packet is transmitted in the tunnel each period, the length of time that packets are delayed by the tunnel is bounded.

Figure 4B:
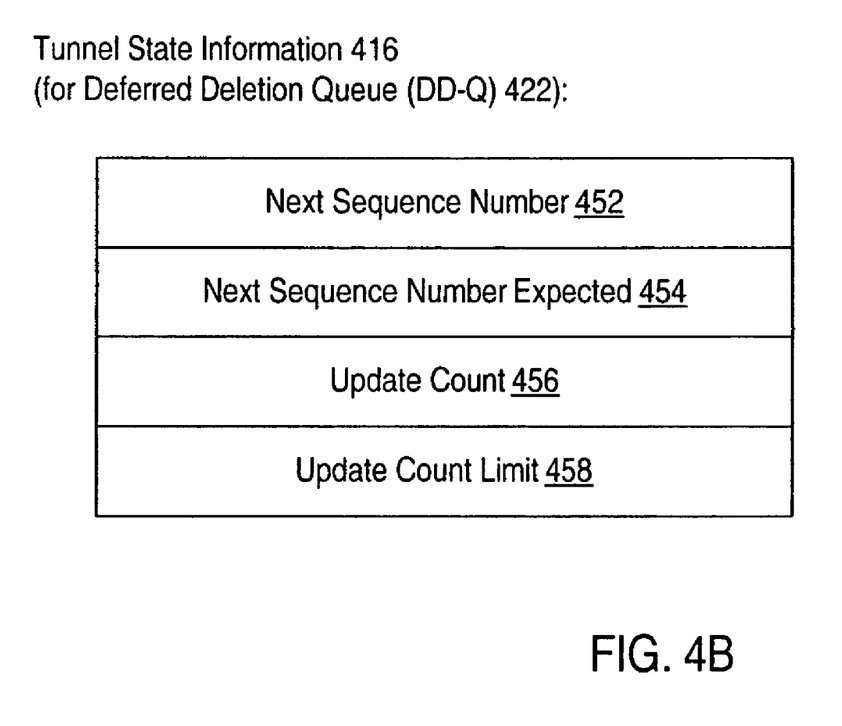
FIG. 4B illustrates tunnel state information that is maintained by the network devices at the ingress of the network tunnel, according to one embodiment of the present invention.

FIG. 4B illustrates tunnel state information 416 that is maintained by ingress network device 152(4) for a network tunnel, according to one embodiment of the present invention. Here, tunnel state information 416 describes the current contents of deferred deletion queue 422 (shown in FIG. 4A). Tunnel state information 416 includes next sequence number 452, next sequence number expected 454, update count 456, and update count limit 458. In one embodiment, next sequence number 452 and next sequence number expected are each 32-bit fields, while update count 456 and update count limit 458 are each 8-bit fields. Other sizes are used in other embodiments.

Next sequence number 452 indicates the sequence number to include in the tunnel header of the next packet that is transmitted via the network tunnel. Next sequence number expected 454 indicates the sequence number of the packet that has been outstanding within the network tunnel for the longest amount of time. This is the next sequence number that network device 152(4) expects network device 152(6) (the network device at the egress of the network tunnel, as shown in FIG. 1) to acknowledge receipt of.

The value of update count 456 indicates the number of times that a packet has been retransmitted from network device 152(4). The value of update count limit 458 limits the number of times update count 456 will be updated. For example, in one embodiment, if the value of update count 456 equals or exceeds the value of update count limit 458, update count 456 will be reset to its initial value (e.g., zero).

The length of the deferred deletion queue is indicated by the difference between the current value of next sequence number 452 and the current value of next sequence number expected 454. Calculating the length of the deferred deletion queue based on these values ensures that the deferred deletion queue cannot overflow based on the number packets already contained in the deferred deletion queue plus the number of packets about to be forwarded to the deferred deletion queue (e.g., the packets that are currently queued in the transmission queue used to store packets to be transmitted over the tunnel).

Control unit 410 (as shown in FIG. 4A) can determine the packet sequence number to include in a tunneled packet's tunnel header from the value of next sequence number 452. For example, control unit 410 can use the current value of next sequence number 452 as the packet sequence number, increment next sequence number 452, and then enqueue the encapsulated packet for transmission with that sequence number as part of the encapsulating packet header.

Figure 5:
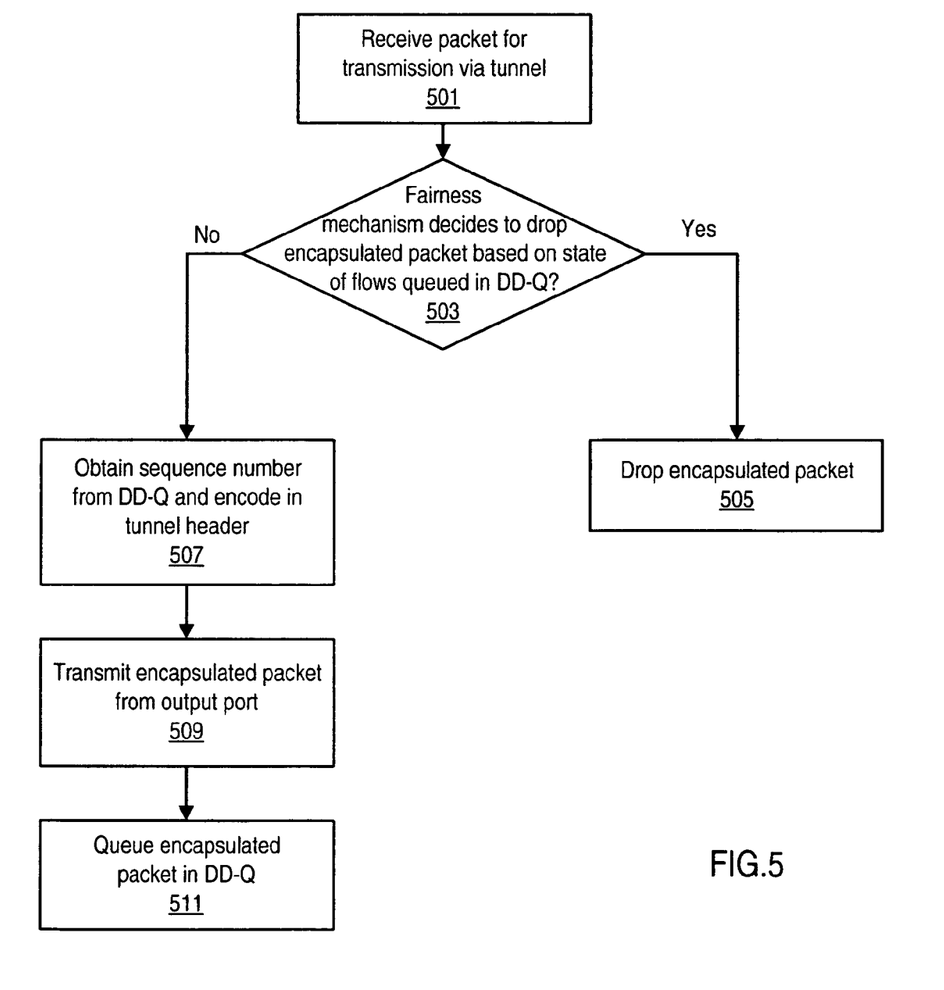
FIG. 5 is a flowchart of one embodiment of a method of operating a network device at the ingress of a network tunnel.

FIG. 5 is a flowchart of one embodiment of a method of operating a network device at the ingress of a network tunnel. At 501, a packet is received for transmission via a network tunnel. As shown at 503, a fairness mechanism in the ingress network device can decide whether to drop the packet based on the state of a particular flow, in which that packet is included, with respect to a deferred deletion queue (DD-Q). If the fairness mechanism determines that the packet should be dropped (e.g., if the flow in which the packet is included is contributing to a congested state), the packet is dropped, as shown at 505.

Otherwise, if the fairness mechanism determines that the packet should not be dropped, a sequence number for the packet is obtained from state information associated with the deferred deletion queue and encoded in a tunnel header with which the packet is encapsulated, as shown at 507. The encapsulated packet is then transmitted from an output port associated with the tunnel, as shown at 509. The encapsulated packet is also added to the deferred deletion queue, as shown at 511.

Figure 6A:
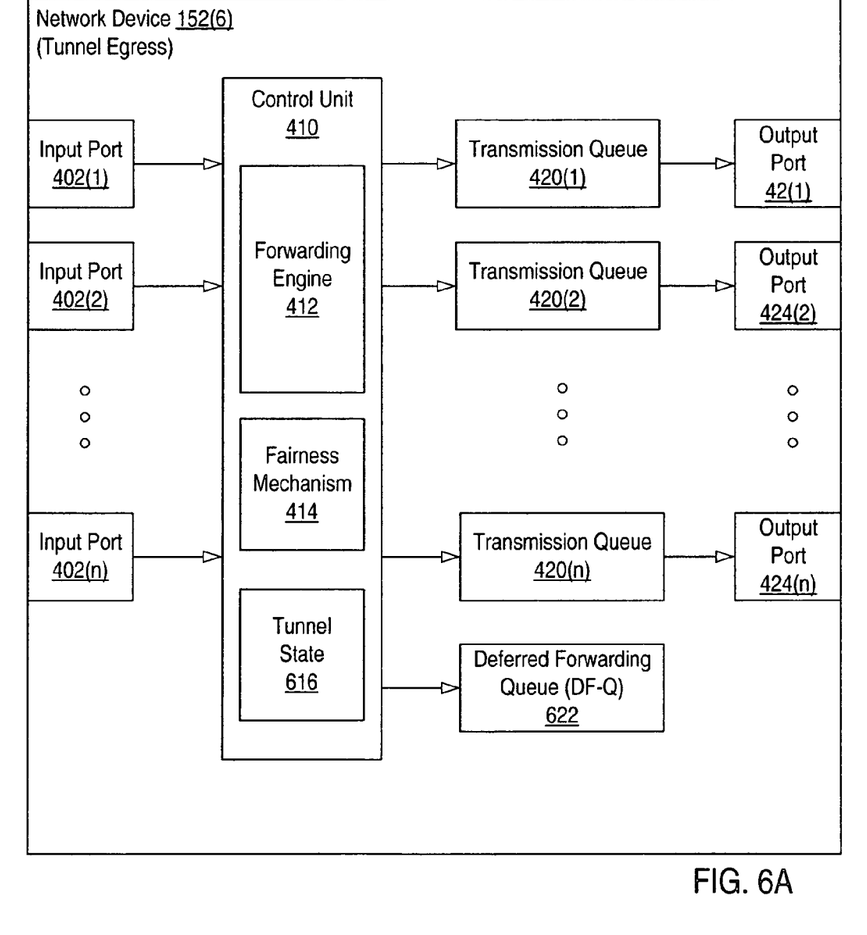
FIG. 6A is a block diagram of a network device for use at the egress of a network tunnel, according to one embodiment of the present invention.

FIG. 6A is a block diagram of a network device for use at the egress of a network tunnel, according to one embodiment of the present invention. Like network device 152(4) of FIG. 4A, network device 152(6) includes several input ports 402(1)-402(n), control unit 410, transmission queues 420(1)-420(n), and output ports 424(1)-424(n). Control unit 410 of network device 152(6) includes forwarding engine 412, fairness mechanism 414, and tunnel state information 616. Components of network device 152(6) that are identified using reference numbers used in FIG. 4A behave in substantially the same way as their similarly-numbered counterparts in network device 152(4).

Network device 152(6) includes deferred forwarding queue (DF-Q) 622. When a tunnel is established between an ingress network device (such as ingress network device 152(4)) and egress network device 152(6), a deferred forwarding queue (DF-Q) for that tunnel is allocated in egress network device 152(6). Tunnel state information 616 in egress network device 152(6) is associated with deferred forwarding queue 622. Deferred forwarding queue 622 stores packets that are received out-of-order (e.g., as indicated by sequence numbers included in each packet's tunnel header). Packets are removed from deferred forwarding queue 622 when they are forwarded by forwarding engine 412.

Figure 6B:
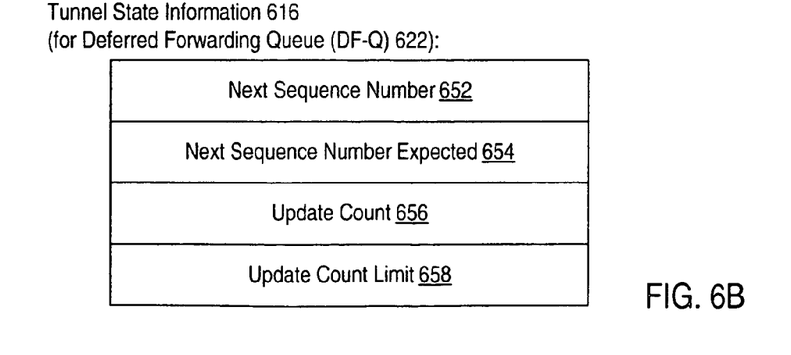
FIG. 6B illustrates tunnel state information that is maintained by the network devices at the egress of the network tunnel, according to one embodiment of the present invention.

Tunnel state information 616 in network device 152(6) can include information such as that shown in FIG. 6B. For example, tunnel state information 616 can include next sequence number 652, which indicates the sequence number of the next packet that network device 152(6) is prepared to receive via the tunnel (e.g., if deferred forwarding queue 622 has room for seven packets, and the most recently received packet has a sequence number of 4, next sequence number 652 would have a value of 11). Tunnel state information 416 can also include next sequence number expected 654, which indicates the sequence number of the next packet that network device 152(6) is expecting in an in-order sequence of packets being received via the network tunnel. For example, if the network device 152(6) receives packets with sequence numbers 1-4 in that order, next sequence number expected 654 will have a value of 5. The difference between next sequence number 652 and next sequence number expected 654 can indicate the length of deferred forwarding queue 622.

Update count 656 tracks the number of packets received via the tunnel by network device 152(6). Update count limit 658 limits the number of times update count 656 is updated before being reset. Each time update count 656 is reset (or alternatively, each time update count 656 reaches a maximum value), network device 152(6) can send a packet to the ingress network device (e.g., network device 152(4)). This packet can indicate which packets have been received via the tunnel by network device 152(6). When it reaches the limit value specified by update count limit 658, update count 656 is cleared and an update packet is generated and transmitted back to the tunnel ingress indicating the current state of the tunnel egress point. For example, the update packet can indicate which packets have been received via the tunnel, if any, since the last update packet was sent. In one embodiment, the update packet includes the current value of next sequence number 652 and the current value of next sequence number expected 654, thus indicating which packets have been received, in-order, at the tunnel egress (all packets up to the packet having a sequence number equal to the current value of next sequence number expected 654) as well as the current capacity of deferred forwarding queue 622 (thus providing flow control to the tunnel ingress).

Returning to FIG. 6A, when a tunnel-encapsulated packet is received at one of input ports 402 of network device 152(6), forwarding engine 412 maps the packet's tunnel header to forwarding information associated with the tunnel. The forwarding information associated with the tunnel includes a designation of the deferred forwarding queue associated with that tunnel. If the packet's tunnel header includes a sequence number that is equal to the current value of next sequence number expected 654 associated with the designated deferred forwarding queue, next sequence number expected 654 is incremented. The packet is then de-encapsulated and forwarded as normal, without being added to deferred forwarding queue 622 (i.e., since the packet is received in-order, forwarding of that packet does not need to be deferred). Additionally, if deferred forwarding queue 622 is non-empty and if the packet at the head of deferred forwarding queue 622 has a sequence number that is equal to the updated value of next sequence number expected 654, the packet at the head of the deferred forwarding queue 622 is then forwarded by forwarding engine 412 as if that packet had been just received at one of input ports 402.

If the received packet's sequence number is less than next sequence number expected 654, a copy of that packet has already been received by network device 152(6) and the packet is dropped. If the packet's sequence number is greater than next sequence number expected 654 and less than next sequence number 656 (e.g., if the packet is received out-of-order and is within the window of packets that the tunnel egress is prepared to receive) and if there is space in deferred forwarding queue 622, the packet is added to the deferred forwarding queue 622. If there is no space in deferred forwarding queue 622, as indicated by difference between the current values of next sequence number 652 and next sequence number expected 654, control unit 410 updates (e.g., by incrementing) next sequence number expected 654 to make room for the new packet. If the updated value of next sequence number expected 654 equals the sequence number of the packet at the head of deferred forwarding queue, that packet will be forwarded by forwarding engine 412 and next sequence number expected 654 is updated again to reflect the removal of this packet from deferred forwarding queue 622. This in turn can possibly cause one or more packets at the head of the deferred forwarding queue 622 to become eligible for forwarding.

When a packet is removed from the deferred forwarding queue 622 and handled by forwarding engine 412, the packet can be recirculated into the deferred forwarding queue 622 again in order to allow for extra tunnel processing. For example, the first time the packet is handled by forwarding engine 412, forwarding engine 412 processes the packet's tunnel header. A lookup performed based on information in the tunnel header may indicate that the packet should be de-encapsulated and recirculated so that a second lookup can be performed based on the packet's inner header. When forwarding engine 412 performs a lookup based on the packet's inner header, information is obtained that designates the appropriate output port 424 from which to output the de-encapsulated packet.

It is noted that a network device can be configured to communicate packets in several different network tunnels at the same time. For example, in addition to being the ingress network device for tunnel 160 (as shown in FIG. 1), ingress network device 152(4) can also be an egress network device for another tunnel, and/or an intermediate network device for yet another tunnel. Network tunnels can be dynamically established and removed, and the number of tunnels in which a network device participates can vary over time. Thus, a network device can include multiple deferred deletion queues and/or deferred forwarding queues at any given time.

Figure 7:
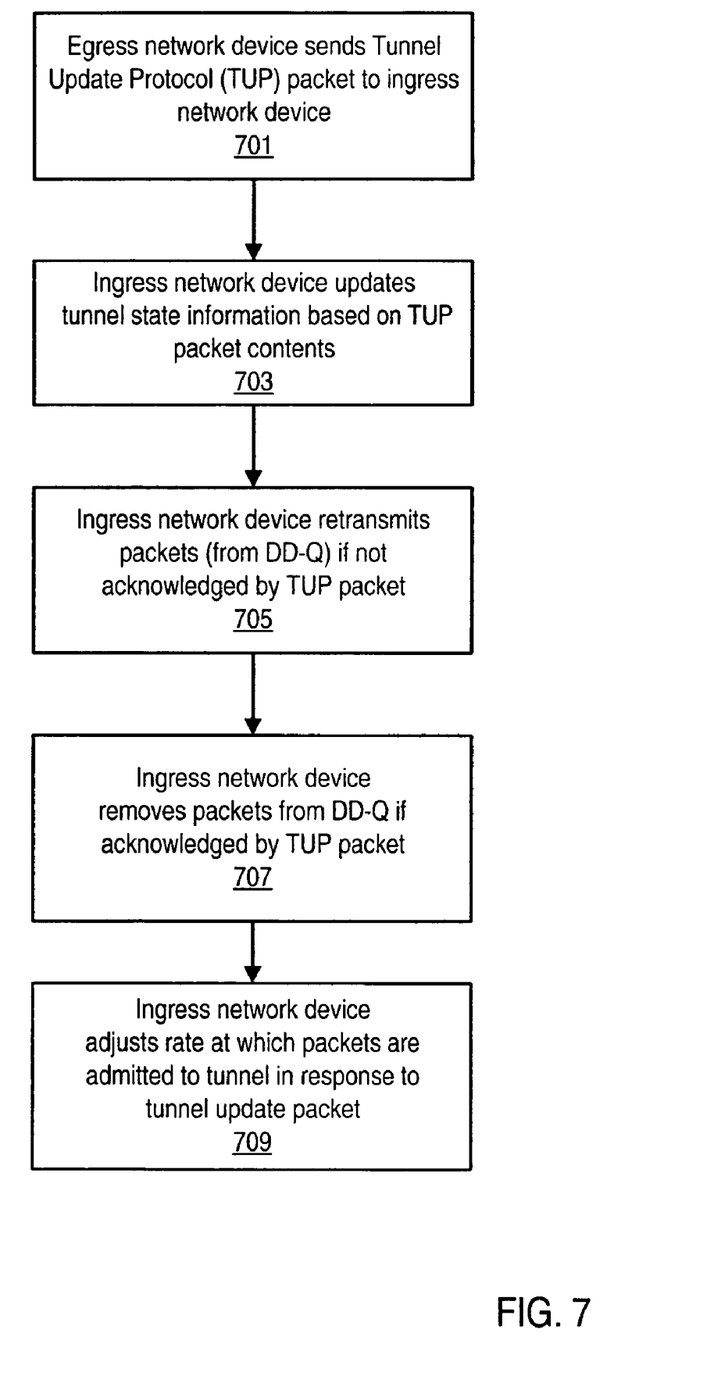
FIG. 7 is a flowchart of one embodiment of a method of using a tunnel update protocol to communicate information regarding the status of the network tunnel from the tunnel egress device to the tunnel ingress device.

As noted in the discussion of FIGS. 4A-4B and 6A-6B, a network device at the egress of a tunnel can send tunnel update packets to the network device at the ingress of the tunnel to indicate which packets have been successfully transmitted via the tunnel and/or to identify the window of packets that the tunnel egress is prepared to receive. These packets can be generated and processed according to a tunnel update protocol. FIG. 7 is a flowchart of one embodiment of a method of using such a tunnel update protocol to communicate information regarding the status of the network tunnel from the tunnel egress device to the tunnel ingress device.

As shown at 701 of FIG. 7, a network device at the tunnel egress sends a tunnel update protocol (TUP) packet to the network device at the tunnel ingress. For example, as noted above, the network device at the tunnel egress can send a tunnel update packet each time the tunnel egress receives a certain number of packets via the tunnel. Alternatively, the network device at the tunnel egress can send a tunnel update packet periodically or in response to other trigger conditions (e.g., in response to the deferred forwarding queue associated with the tunnel reaching a certain occupancy). The tunnel update protocol packet can include information indicating which packets have been successfully received, in-order, by the tunnel egress, information indicating which and/or how many packets the tunnel egress is prepared to receive, and/or other information indicative of the state of the tunnel. For example, the tunnel update protocol packet can include the next sequence number expected (e.g., next sequence number expected 654 of FIG. 6B), which identifies the next in-order packet in an ordered sequence of packets that the egress expects to receive, and the next sequence number (e.g., next sequence number 652 of FIG. 6B), which indicates the range of packets the egress is prepared to receive and buffer (e.g., no packets with higher sequence numbers should be transmitted to the egress).

Based on the tunnel update protocol packet, the network device at the tunnel ingress updates tunnel state information maintained at the tunnel ingress, as shown at 703. For example, the network device at the tunnel ingress can update information that identifies which packets are currently outstanding within the tunnel if the tunnel update protocol packet indicates that the tunnel egress has successfully received and forwarded one or more packets.

If the tunnel update protocol packet indicates that one or more packets have been dropped in the network tunnel (e.g., by failing to acknowledge those packets), the network device at the ingress of the network tunnel can retransmit the dropped packets, as shown at 705. For example, if the tunnel update protocol packet includes a next sequence number expected (by the tunnel egress) that has a value greater than the next sequence number expected for the deferred deletion queue at the tunnel ingress, it indicates that the tunnel egress has received all of the packets that were outstanding in the network tunnel that have sequence numbers less than the specified next sequence number expected in the tunnel update protocol packet. In such a situation, the next sequence number expected value that is associated with the deferred deletion queue is updated to equal the value of next sequence number expected specified in the tunnel update protocol packet. The packets in the deferred deletion queue that have sequence numbers less than this value are scheduled for removal from the deferred deletion queue (as indicated at 707). Since the sequence numbers may be reused, the determination as to whether the next sequence number expected included in the tunnel update protocol packet is greater than the next sequence number expected associated with the deferred deletion queue can be performed based on the next sequence number expected of the deferred deletion queue, modulo whatever range is used by the sequence numbers (e.g., mod $2^{32}$). The count field associated with the deferred deletion queue can also be cleared upon receipt of a tunnel update packet indicating that one or more outstanding packets have been successfully received at the tunnel egress.

If the next sequence number expected specified in the tunnel update protocol packet is equal to that currently specified for the deferred deletion queue, the packet at the head of the deferred deletion queue has that sequence number, and the count field for the deferred deletion queue is zero, the network device at the tunnel ingress schedules the packet with that sequence number for retransmission and increments the count field. Otherwise, the update count field associated with the deferred deletion queue is incremented and then cleared if equal to the update count limit value. If the update packet indicates a sequence number that is less than the value currently recorded, the update is ignored.

The network device at the tunnel ingress can also adjust the rate at which packets are admitted to tunnel in response to information included in the tunnel update packet, as indicated at 709. For example, if the tunnel update protocol packet indicates that one or more packets have been dropped within the tunnel (e.g., as described above), the network device at the tunnel ingress can reduce the rate at which packets are admitted to the tunnel (e.g., by reducing the effective size of the deferred deletion queue).

Figure 8:
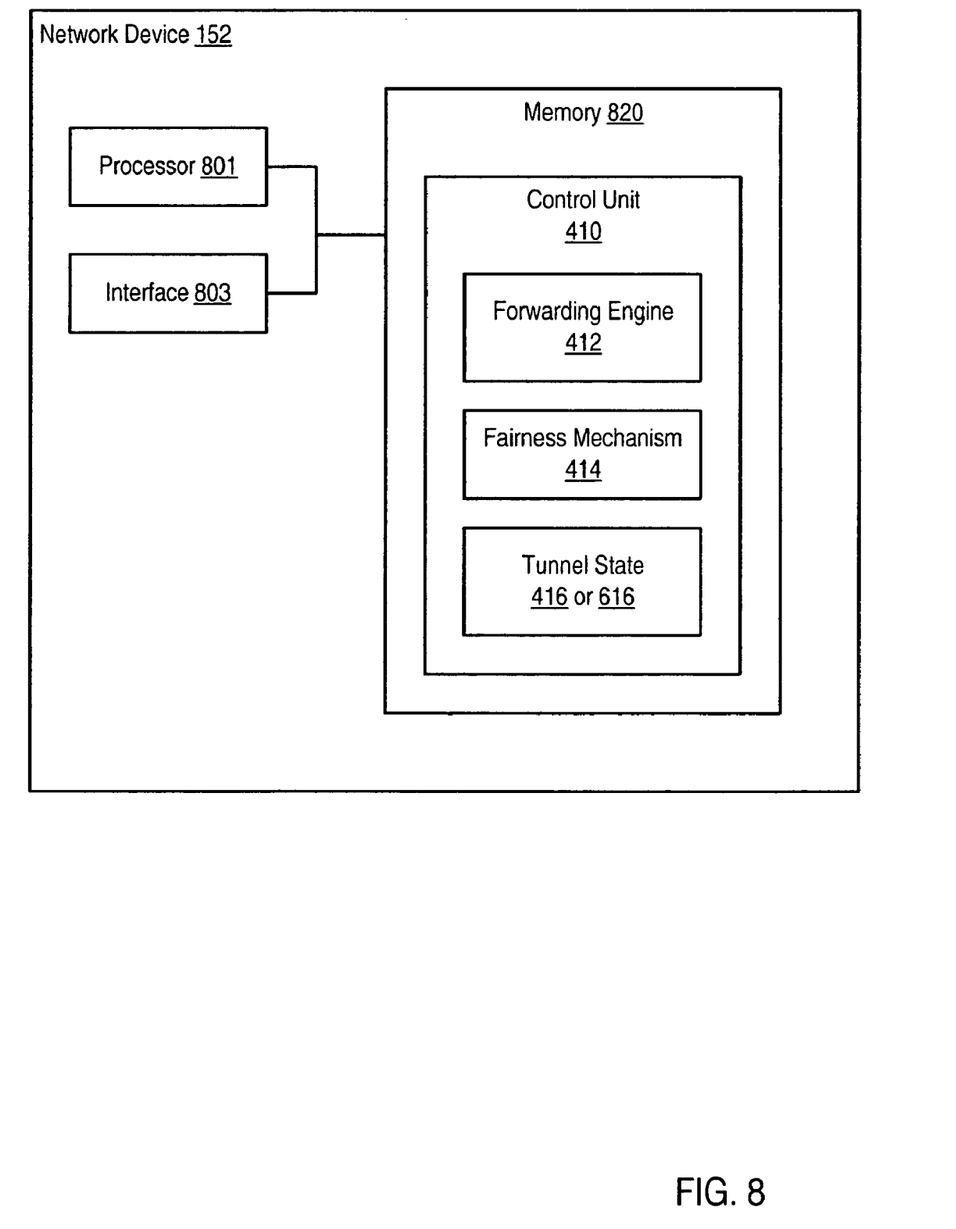
FIG. 8 shows a network device that includes software configured to control an ingress and/or an egress of a network tunnel, according to one embodiment of the present invention.

FIG. 8 shows a block diagram of network device 152 that includes software configured to control an ingress and/or an egress of a network tunnel. As shown, the functionality of control unit 410 is entirely implemented in software in this embodiment. It is noted that this functionality is implemented in hardware or in a combination of hardware and software in other embodiments. For example, a portion of the functionality of control unit 410 is implemented as an ASIC (Application Specific Integrated Circuit) in some embodiments. In such embodiments, the ASIC can execute software implementing the functionality of components such as fairness mechanism 414 and can access a memory device that stores tunnel state information 416.

As shown in FIG. 8, network device 152 can include one or more processors 801 (e.g., microprocessors, PLDs (Programmable Logic Devices), or ASICs (Application Specific Integrated Circuits)), one or more interfaces 803 (e.g., for communicating packet descriptors of packets received via input ports or network device 152), and memory 820. Memory 820 can include various types of memory, including ROM (Read Only Memory), RAM (Random Access Memory), MEMS (Micro Electro-Mechanical Systems) memory, Flash memory, and the like. Process 801, interface 803, and memory 820 are coupled to send and receive control and/or data signals by a bus or other interconnect.

Processor 801 is configured to execute program instructions stored in memory 820. Here, memory 820 stores data and program instructions implementing control unit 410, including program instructions executable to implement forwarding engine 412, program instructions executable to implement fairness mechanism 414, and data making up tunnel state information 416.

The program instructions and data implementing control unit 410 can be stored upon various computer readable media such as memory 820. In some embodiments, control unit 410 software is stored on a computer readable medium such as a CD (Compact Disc), DVD (Digital Versatile Disc), hard disk, optical disk, tape device, floppy disk, and the like). In order be executed by processor 801, the instructions and data implementing control unit 410 are loaded into memory 820 from the other computer readable medium. The instructions and/or data implementing can also be transferred to network device 152 via a network such as the Internet or upon a carrier medium. In some embodiments, a computer readable medium is a carrier medium such as a network and/or a wireless link upon which signals such as electrical, electromagnetic, or digital signals, on which the data and instructions implementing control unit 410 are encoded, are conveyed.

Although the present invention has been described with respect to specific embodiments thereof, various changes and modifications may be suggested to one skilled in the art. It is intended that such changes and modifications fall within the scope of the appended claims.

What is claimed is:

1. A network device comprising:
an output port;
a first queue coupled to the output port;
a control unit coupled to the output port;
a second queue configured to store a copy of a packet forwarded to the output port; and
a memory coupled to the output port,
wherein the output port is configured to output the packet for transmission via a network tunnel,
wherein outputting the packet for transmission comprises removing the packet from the first queue and storing a copy of the packet in the second queue,
wherein the network tunnel aggregates a plurality of flows,
wherein the memory is configured to store information,
wherein the information identifies packets which have been forwarded via the network tunnel, and
wherein the second queue indicates how many packets in each of the flows are outstanding within the network tunnel.

2. The network device of claim 1, wherein
the memory is comprised in the control unit; and
the control unit is configured to update the information in the memory to indicate that the packet was sent via the network tunnel, in response to forwarding the packet to the output port.

3. The network device of claim 1, wherein
the control unit is configured to send a copy of the packet to a loopback port with which the queue is associated, and
the copy of the packet is stored in the second queue in response to the packet being received by the loopback port.

4. The network device of claim 1, wherein
the control unit is configured to identify a flow of the plurality of flows being aggregated for transmission via the network tunnel,
the flow comprises a particular packet, and
the control unit is configured to select whether the particular packet is admitted to the network tunnel based on which flow comprises the particular packet.

5. The network device of claim 4, wherein
the control unit is configured to drop the particular packet if the flow currently has a threshold number of packets stored in the second queue; and
the control unit is configured to admit the particular packet for transmission via the network tunnel if the flow currently has fewer than the threshold number of packets stored in the second queue.

6. The network device of claim 1, wherein
the control unit is configured to forward the copy of the packet stored in the second queue to the output port for retransmission via the network tunnel if the packet is dropped in the network tunnel.

7. The network device of claim 6, wherein
the control unit is configured to determine that the packet was dropped in the network tunnel in response to the information stored in the memory and in response to information received from another network device.

8. The network device of claim 6, wherein
the control unit is configured to send the copy of the packet stored in the second queue via the network tunnel if the copy of the packet is dropped in the network tunnel.

9. The network device of claim 1, wherein
the control unit is configured to control a usage level of the second queue by adjusting a rate at which packets are removed from the second queue, and
the control unit is configured to admit a particular packet for transmission via the network tunnel based on the usage level of the second queue.

10. The network device of claim 9, wherein
the control unit is configured to reduce the rate at which packets are removed from the second queue if the usage level of the second queue exceeds a threshold usage level.

11. The network device of claim 1, wherein
the control unit is configured to forward a new packet to the output port for transmission via the network tunnel if no packets have been transmitted via the network tunnel for a period of time.

12. The network device of claim 1, wherein the control unit is configured to:
generate a descriptor that identifies the second queue;
encapsulate the packet, wherein encapsulating the packet comprises adding a header to the packet, wherein the header comprises the descriptor; and
forward the packet to the first queue.

13. The network device of claim 1, wherein the control unit is configured to:
detect the number of packets in the first queue;
detect the number of packets in the second queue; and
drop the packet in response to detecting that the number of packets in the first queue exceeds a first threshold value or the number of packets in the second queue exceeds a second threshold value.

14. The network device of claim 1, wherein the control unit is configured to:
detect a first number of packets in the second queue having a first flow label;
detect a second number of packets in the second queue having a second flow label;
drop a packet having a first flow label if the first number exceeds a first threshold value; and
drop a packet having a second flow label if the second number exceeds a second threshold value.

15. The network device of claim 1, wherein the control unit is configured to:
detect the second queue is full;
drop an oldest packet in the second queue;
update a stored number of times the oldest packet has been dropped;

in response to the stored number exceeding a threshold value, decreasing the rate at which packets are output for transmission via the network tunnel.

16. A method comprising:

sending a packet via a network tunnel from a first network device, wherein
the network device comprises an output port and a first queue coupled to the output port, and
the network tunnel aggregates a plurality of flows;
removing the packet from the first queue and storing a copy of the packet in a second queue, in response to the packet being sent via the network tunnel, wherein the second queue indicates how many packets in each of the flows are outstanding within the network tunnel; and
determining whether the packet is dropped in the network tunnel.

17. The method of claim 16, wherein the storing the copy of packet in the second queue comprises:

sending the copy of the packet to a loopback port of the first network device, wherein the loopback port is associated with the second queue.

18. The method of claim 16, further comprising:

removing the copy of the packet from the second queue if the determining whether the packet is dropped in the network tunnel determines that the packet was successfully received at an egress of the network tunnel.

19. The method of claim 16, further comprising:

sending the copy of the packet from the second queue via the network tunnel if the packet is dropped in the network tunnel.

20. The method of claim 16, further comprising:

identifying a flow of the plurality of flows being aggregated for transmission via the network tunnel, wherein the flow comprises a particular packet; and
selecting whether the particular packet is admitted to the network tunnel based on which flow comprises the particular packet.

21. The method of claim 16, further comprising:

controlling a usage level of the second queue; and
admitting a particular packet for transmission via the network tunnel dependent on the usage level of the second queue, wherein the controlling the usage level of the second queue comprises: adjusting a rate at which packets are removed from the second queue.

22. The method of claim 16, further comprising:

sending information to the first network device, wherein the information indicates whether the packet was dropped in the network tunnel.

23. The method of claim 22, further comprising:

storing the packet in an egress queue if the packet is received out of sequence by a second network device.

24. The method of claim 23, further comprising:

removing the packet from the egress queue in response to receiving at least one packet via the network tunnel, wherein
the at least one packet is earlier in a sequence of packets than the packet; and
forwarding the packet in response to the removing the packet from the egress queue.

25. A system comprising:

means for sending a packet via a network tunnel from a first network device, wherein
the network device comprises an output port and a first queue coupled to the output port, and
the network tunnel aggregates a plurality of flows;
means for removing the packet from the first queue and storing a copy of the packet in a second queue, in response to the packet being sent via the network tunnel, wherein the second queue indicates how many packets in each of the flows are outstanding within the network tunnel; and
means for determining whether the packet is dropped in the network tunnel.

26. The system of claim 25, wherein storing the copy of packet in the second queue comprises:

sending the copy of the packet via a loopback port associated with the second queue.

27. The system of claim 25, further comprising:

means for removing the copy of the packet from the second queue if it is determined that the packet was successfully received at an egress of the network tunnel.

28. The system of claim 25, further comprising:

means for sending the copy of the packet from the second queue via the network tunnel if the packet is dropped in the network tunnel.

29. The system of claim 25, further comprising:

means for identifying a flow of the plurality of flows being aggregated for transmission via the network tunnel, wherein the flow comprises a particular packet; and
means for selecting whether the particular packet is admitted to the network tunnel based on the flow in which the particular packet is comprised.

30. The system of claim 25, further comprising:

means for controlling a usage level of the second queue; and
means for admitting a particular packet for transmission via the network tunnel dependent on the usage level of the second queue, wherein controlling the usage level of the second queue comprises:
adjusting a rate at which packets are removed from the second queue.

31. A computer non-transitory readable medium comprising program instructions executable to:

send a packet via a network tunnel from a first network device, wherein
the network device comprises an output port and a first queue coupled to the output port, and
the network tunnel aggregates a plurality of flows;
remove the packet from the first queue and store a copy of the packet in a second queue, in response to the packet being sent via the network tunnel, wherein the second queue indicates how many packets in each of the flows are outstanding within the network tunnel; and
determine whether the packet is dropped in the network tunnel.

32. The computer readable medium of claim 31, wherein storing the copy of packet in the second queue comprises:

sending the copy of the packet to a loopback port associated with the second queue.

33. The computer readable medium of claim 31, wherein the program instructions are further executable to:

remove the copy of the packet from the second queue if it is determined that the packet was successfully received at an egress of the network tunnel.

34. The computer readable medium of claim 31, wherein the program instructions are further executable to:

send the copy of the packet from the second queue via the network tunnel if the packet is dropped in the network tunnel.

35. The computer readable medium of claim 31, wherein the program instructions are further executable to:
- identify a flow of the plurality of flows being aggregated for transmission via the network tunnel, wherein the flow comprises a particular packet; and
- select whether the particular packet is admitted to the network tunnel based on the flow in which the particular packet is comprised.

36. The computer readable medium of claim 31, wherein the program instructions are further executable to:
- control a usage level of the second queue; and
- admit a particular packet for transmission via the network tunnel dependent on the usage level of the second queue, wherein
- controlling the usage level of the second queue comprises:
  - adjusting a rate at which packets are removed from the second queue.

* * * * *